(12) United States Patent
Okunaka et al.

(10) Patent No.: US 8,226,129 B2
(45) Date of Patent: Jul. 24, 2012

(54) CAB LOCK MECHANISM OF VEHICLE

(75) Inventors: Shigeo Okunaka, Fujisawa (JP);
Hiromichi Matoba, Fujisawa (JP); Eiji Yamashina, Koza-gun (JP); Osamu Sekimizu, Koza-gun (JP)

(73) Assignee: Isuzu Motors Limited, Tokyo (JP)

( * ) Notice: Subject to any disclaimer, the term of this patent is extended or adjusted under 35 U.S.C. 154(b) by 258 days.

(21) Appl. No.: 12/516,327

(22) PCT Filed: Nov. 27, 2007

(86) PCT No.: PCT/JP2007/072864
§ 371 (c)(1),
(2), (4) Date: May 26, 2009

(87) PCT Pub. No.: WO2008/066045
PCT Pub. Date: Jun. 5, 2008

(65) Prior Publication Data
US 2010/0060018 A1    Mar. 11, 2010

(30) Foreign Application Priority Data
Nov. 27, 2006 (JP) .................. 2006-319385

(51) Int. Cl.
*E05C 19/12* (2006.01)
(52) U.S. Cl. ............... 292/11; 292/216; 292/201
(58) Field of Classification Search ............... 292/11, 292/201, 216, DIG. 23
See application file for complete search history.

(56) References Cited

U.S. PATENT DOCUMENTS

| 4,413,694 A | * | 11/1983 | Slocombe et al. | ......... 180/89.14 |
| 4,413,696 A | * | 11/1983 | Slocombe et al. | ......... 180/89.14 |
| 5,025,880 A | * | 6/1991 | Kato | ..................... 180/89.14 |
| 6,053,545 A | * | 4/2000 | Asmundson et al. | ......... 292/210 |
| 6,474,705 B1 | * | 11/2002 | Mori et al. | ..................... 292/216 |

FOREIGN PATENT DOCUMENTS

| GB | 1569095 A | 6/1980 |
| JP | 59-60078 A | 4/1984 |
| JP | 5-34088 A | 5/1993 |
| JP | 5-35564 A | 5/1993 |
| JP | 2002-129799 A | 5/2002 |

* cited by examiner

*Primary Examiner* — Kristina Fulton

(57) ABSTRACT

A link 11 reaches a locking position in response to movement of a rod 9. A cab lock hook 12 is rotatably supported by the link 11, and arrives at a locking position in response to rotation of the link 11 toward the locking position, thereby engaging with a pin 4 on the chassis side 2. A switch 40 is fixed to a cab 1, and when it is pressed down, the state thereof changes accordingly. A lock close portion 60 is rotatably supported by the other end of the cab 1, and is movable between a closing position and a non-closing position. The lock close portion 60 in the closing position engages with a rod connecting shaft 27 while the link 11 is in the locking position, and prevents movement of the link 11 in a lock release direction. The lock close portion 60 includes a switch pressure section 66, which presses down the switch 40 when the lock close portion 10 reaches the closing position from the non-closing position.

2 Claims, 3 Drawing Sheets

CAB LOCK MECHANISM OF VEHICLE

TECHNICAL FIELD

The present invention relates to a cab lock mechanism of locking a tiltable cab on a chassis side.

BACKGROUND ART

Generally, a cab lock mechanism, which locks a non-tilted cab on a chassis side, is deployed in cab-over-engine type vehicles equipped with a cab tiltable around a tilt shaft on the front end side.

Japanese Unexamined Utility Model Publication No. Hei 5-34088 discloses a structure including a tilt lock sensor fixed above a press-moving board of a plate on the cab side, which is always urged downwards and which comes into contact with the upper end of a hook on the chassis side in a cab locked state and thus rotates upward.

The tilt lock sensor detects a tilt locked state by sensing a contact with the press-moving board.

Moreover, Japanese Unexamined Utility Model Publication No. Hei 5-35564 discloses a structure in which a tilt lock sensor is attached to a locking member on the chassis side, which temporarily locks the entire cab through engagement with a safety hook on the cab side. The tilt lock sensor detects a tilt lock state by sensing displacement of the safety hook when the cab changes to a cab locked state from a temporary locked state.

Patent Document 1: Japanese Unexamined Utility Model Publication No. Hei 5-34088

Patent Document 2: Japanese Unexamined Utility Model Publication No. Hei 5-35564

DISCLOSURE OF THE INVENTION

Problems to be Solved by the Invention

With the structure disclosed in Japanese Unexamined Utility Model Publication No. Hei 5-34088, since the plate to be sensed by a cab lock sensor is not made of a material capable of maintaining a cab locked state, detection of the cab locked state may not be assured.

Moreover, a vibration absorber is arranged between a cab and a frame for vibration absorption. Since the cab vibrates against the frame while the vehicle is running, a plate on the cab side also vibrates in response to movement of a hook on the frame side, resulting in such vibration transmitted to the tilt lock sensor.

That is, since the plate and the tilt lock sensor are directly affected by cab's vibration against the frame, a burden may easily be imposed on the tilt lock sensor, resulting in decreased durability. Moreover, in order to decrease the burden on the tilt lock sensor, it is necessary to prepare a certain clearance between a tilt lock sensor and a press-moving board, leading to decrease in tilt lock state detection accuracy.

Regarding this point, with the structure disclosed in Japanese Unexamined Utility Model Publication No. Hei 5-35564, a safety hook to be sensed by a cab lock sensor is not a component for keeping a cab and a chassis in a cab locked state. Moreover, the safety hook is arranged on the cab side, and the tilt lock sensor is arranged on the chassis side. This may lead to the same inconvenience as that described in Japanese Unexamined Utility Model Publication No. Hei 5-34088 described above.

In light of this problem, the present invention aims to provide a cab lock mechanism capable of certainly detecting a cab locked state as well as suppressing decrease in durability and detection accuracy.

Means for Solving the Problems

In order to solve the problem described above, the present invention provides a cab lock mechanism for a cab-over-engine type vehicle, which locks on a chassis the other end of a cab tiltable around one end of the cab, and the cab lock mechanism includes a rod, a link, a cab lock hook, a switch, a locking engagement part, and a lock close portion.

The rod is arranged on the cab side and moves in response to movement of the cab lock lever. The link is supported rotatably by the other end of the cab, rotates in a locking direction from an initial position in response to movement of the rod, and then reaches a locking position. The cab lock hook is supported rotatably by the link, moves in a locking direction from an initial position and reaches a locking position in response to rotation of the link toward the locking position, and engages, in the locking position, with a pin fixed to the chassis side. The switch is fixed to the other end of the cab and changes in state by being pressed down. The locking engagement part is formed in the link. The lock close portion is supported rotatably by the other end of the cab and is movable between a closing position and a non-closing position.

The lock close portion in the closing position engages with the locking engagement part while the link is in the locking position, and prevents movement of the link in a lock release direction. The lock close portion includes a switch pressure section, which presses down the switch when the lock close portion reaches the closing position from the non-closing position.

With the configuration described above, in order to lock a non-tilted cab on the chassis side, the cab lock lever is operated in a locking direction. At this time, the link rotates in the locking direction to the locking position from the initial position in response to movement of the cab lock lever, and the cab lock hook moves in the locking direction to the locking position from the initial position in response to rotation of the link. Movement of this cab lock hook results in engagement of itself with the pin fixed to the chassis, and the cab lock hook enters a cab locked state. Once the lock close portion moves to the closing position from the non-closing position, the lock close portion engages with the locking engagement part, thereby preventing movement of the link in the lock release direction. As a result, the cab locked state is maintained. Moreover, when the lock close portion arrives at the closing position, the switch pressure section presses down the switch, thereby changing the state of the switch and allowing detection of the cab locked state.

Since the switch pressure section, which presses down the switch, is deployed in the lock close portion, which keeps the cab locked state, detection of the cab locked state can be made surely.

Moreover, since the switch pressure section and the switch are both arranged on the cab side, the switch pressure section and the switch are rarely influenced by the cab's vibration to the chassis, and decrease in durability of the switch and decrease in detection accuracy may be suppressed.

Furthermore, an urging means for urging the lock close portion towards a closing position may be provided, and the lock close portion may include a cam. When the cam comes into contact with the link while the lock close portion is in a non-closing position and the link is in a non-locking position, movement of the lock close portion towards the closing position is prevented. With the configuration described above, since the urging means urges the lock close portion towards the closing position, movement of the lock close portion towards the non-closing position is prevented by the urging force from the urging means. Moreover, movement of the lock close portion towards the closing position is prevented by the cam contacting with the link. Therefore, detection of the cab locked state by the switch may be ensured.

Effects of the Invention

According to the present invention, decrease in durability of the switch and detection accuracy may be suppressed, and detection of the cab locked state may be secured.

EXPLANATION OF REFERENCE NUMERALS

Figure 1:
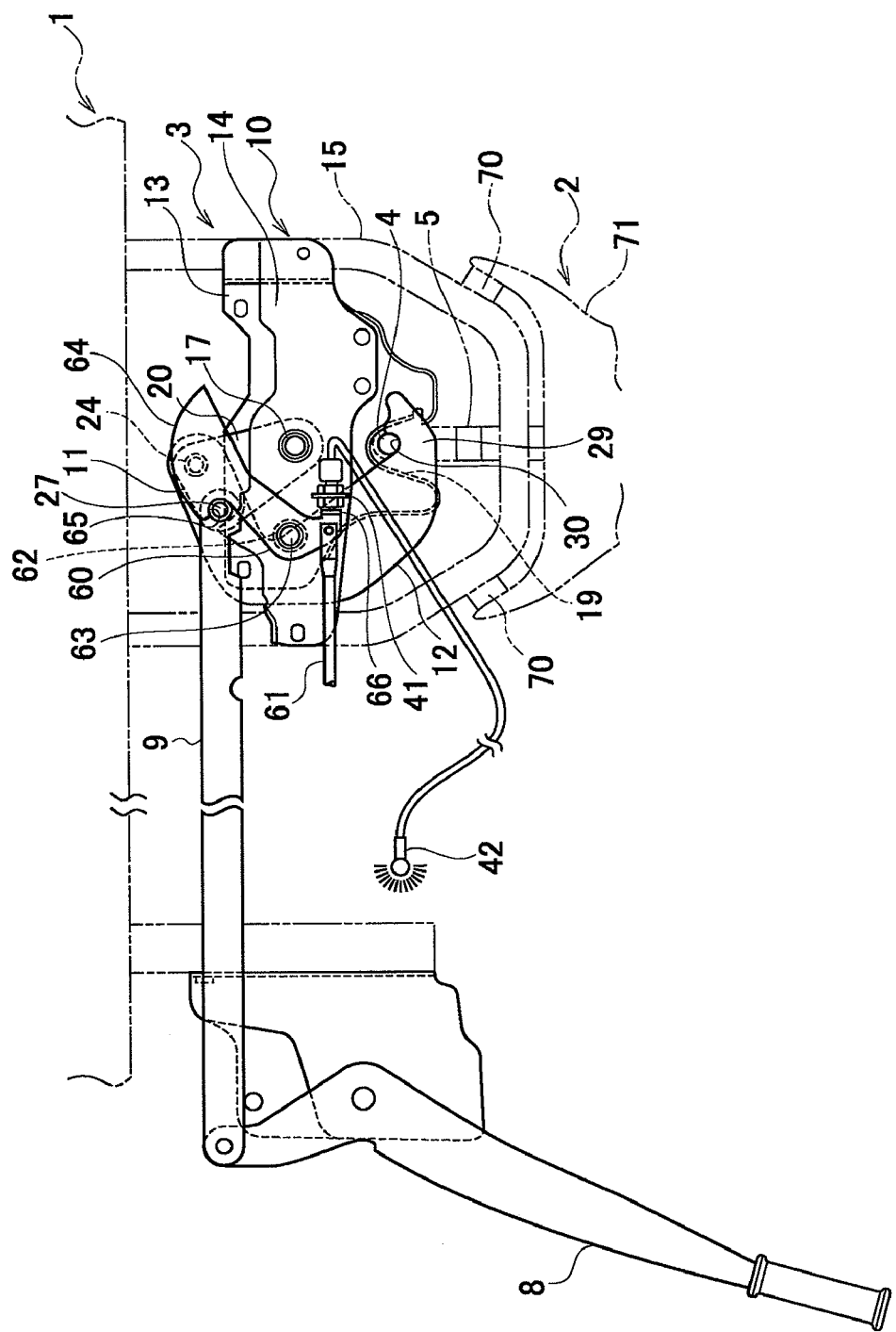
FIG. 1 is a back view of a cab lock mechanism of an embodiment viewed from behind a vehicle.

1 Cab
2 Chassis side
3 Cab locking device
4 Pin
5 Support plate
8 Cab lock lever
9 Rod
10 Base
11 Link
12 Cab lock hook
13 Front plate
14 Rear plate
15 Bracket
17 First revolving shaft
19 Engaging shaft accommodating concave portion
20 Link plate
24 Second revolving shaft
27 Rod connecting shaft (Locking engagement part)
29 Hook
30 Inner surface of hook
40 Switch
41 Switch bracket
60 Lock close portion
61 Lock close operating rod
62 Spring component (Urging member)
63 Lock close connecting shaft
64 Cam portion
65 Engaging concave portion
66 Switch pressure section

BEST MODE FOR CARRYING OUT THE INVENTION

Hereafter, an embodiment according to the present invention is described based on drawings.

Figure 2:
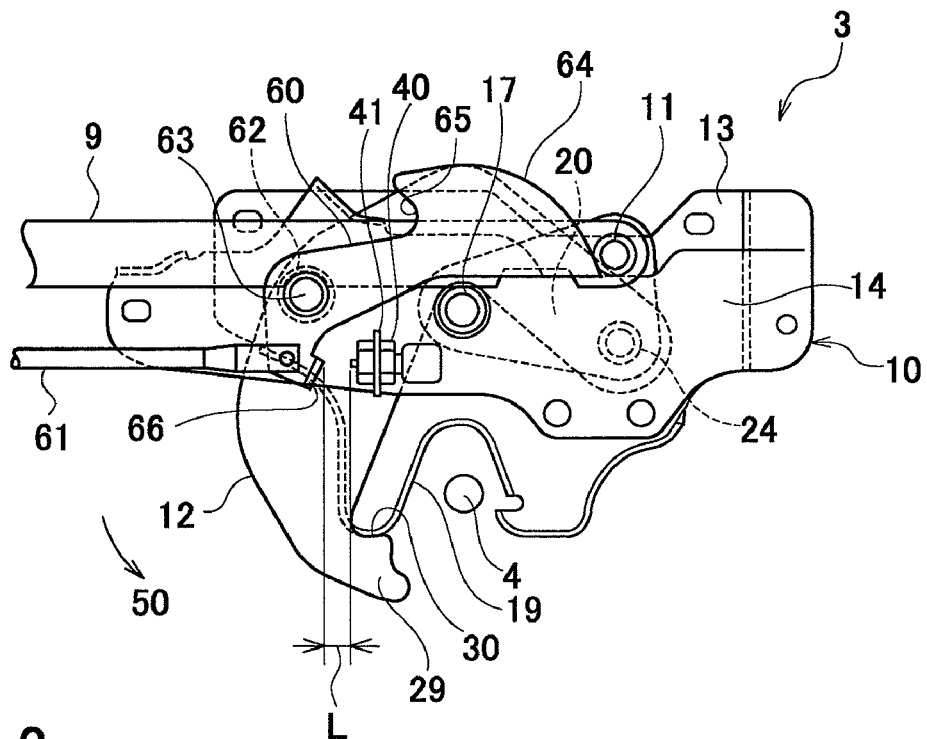
FIG. 2 is a back view of a principal part of the cab lock mechanism in an initial state.
Figure 3:
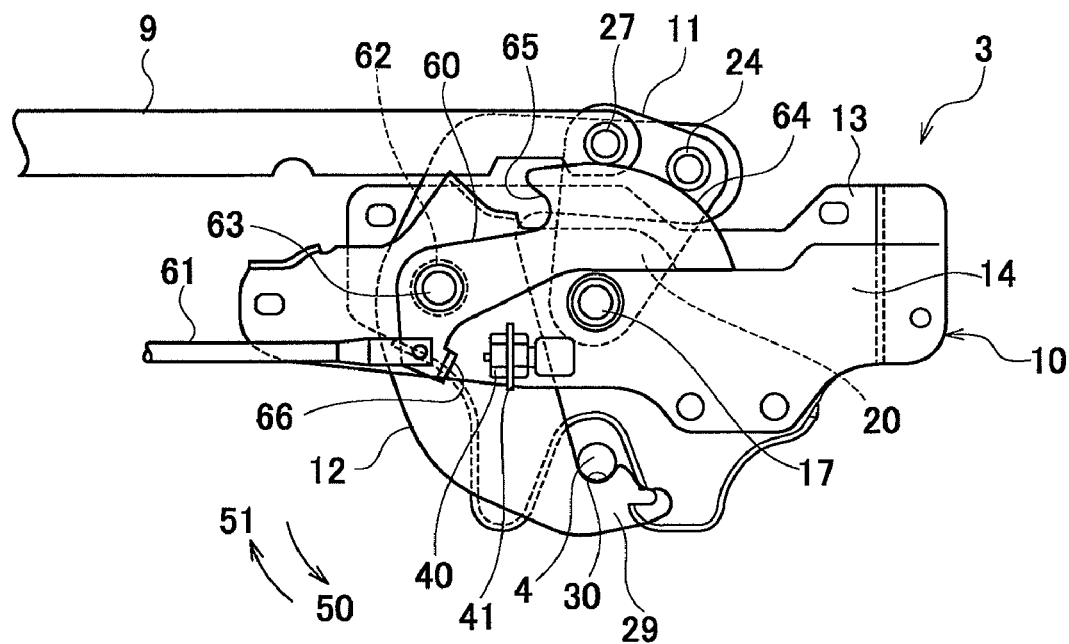
FIG. 3 is a back view of a principal part of the cab lock mechanism midway through changing from the initial state to a cab locked state.
Figure 4:
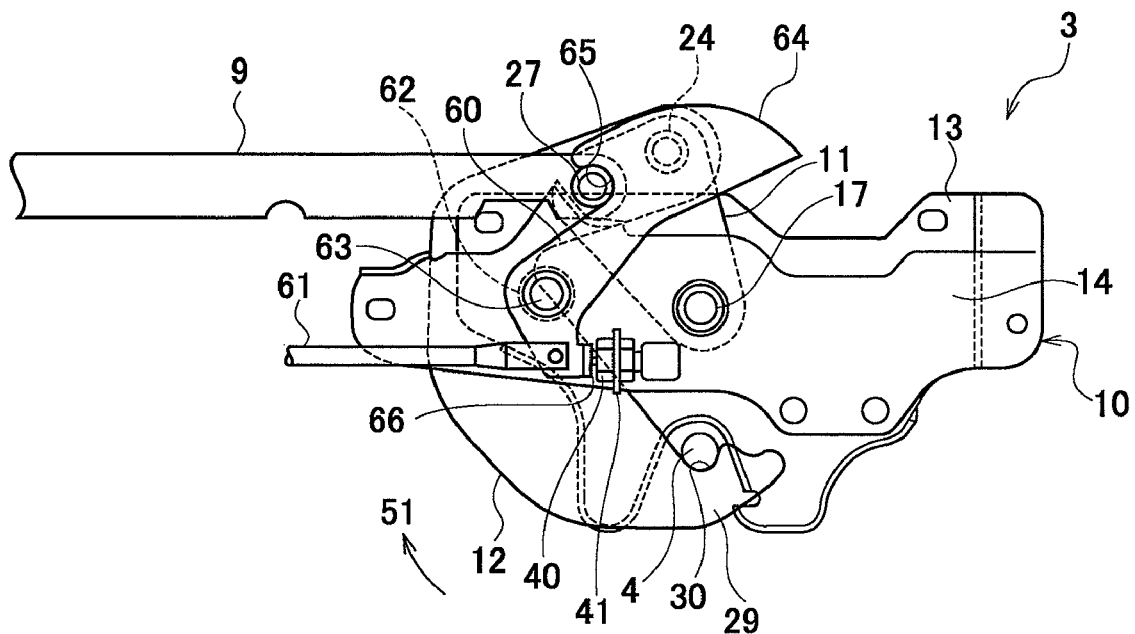
FIG. 4 is a back view of a principal part of the cab lock mechanism in the cab locked state.
Figure 5:
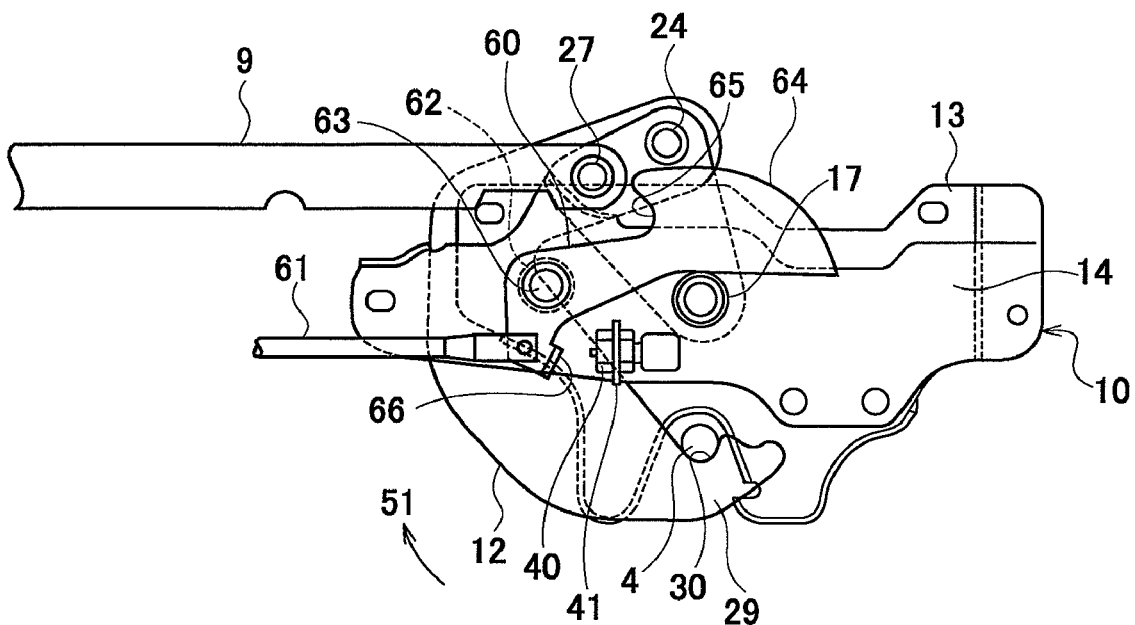
FIG. 5 is a back view of a principal part of the cab lock mechanism showing the time of starting cancellation of the cab locked state.

FIG. 1 is a back view of a cab lock mechanism of an embodiment viewed from behind a vehicle, and FIG. 2 is a back view of a principal part of the cab lock mechanism in an initial state. FIG. 3 is a back view of a principal part of the cab lock mechanism midway through changing from the initial state to a cab locked state, and FIG. 4 is a back view of a principal part of the cab lock mechanism in the cab locked state. FIG. 5 is a back view of a principal part of the cab lock mechanism showing the time of starting cancellation of the cab locked state. Note that 'Right and Left' in the following descriptions means a vehicle width direction when a passenger faces the vehicle front.

As shown in FIG. 1, in a cab-over-engine truck, which has a front end section of a cab 1 supported tiltable around a tilt shaft by a chassis side 2 (not shown in illustrations), a cab locking device 3, which locks the rear edge of the non-tilted cab 1 on the chassis side 2, is fixed to either of right and left sides of the back of the cab 1 in the vehicle width direction. Moreover, a pin 4 is fixed to either of the right and the left side of the chassis side 2 for each cab locking device 3. Note that since each cab locking device 3 on either of the right and the left side has almost the same configuration, only one of the cab locking devices 3 is described, and illustrations and descriptions for the other one are omitted.

The pin 4 is rod-shaped and connects top ends of respective support plates 5 arranged at a distant from each other along the vehicle length, and lower ends of the respective support plates 5 are fixed to the chassis side 2.

A cab lock lever 8 is arranged on one side of the back of the cab 1 along the vehicle width (on the left in this embodiment). One end of the cab lock lever 8 (upper end in FIG. 1) is rotatably supported by the cab 1. One end of this cab lock lever 8 is connected to a link 11, which is described later, via a rod 9, which extends along the vehicle width. When the other end (lower end in FIG. 1) of the cab lock lever 8 is rotated inward along the vehicle width (towards the right side in FIG. 1), the rod 9 will then move towards a locking position (towards the left in FIG. 1). On the other hand, when it is rotated outward along the vehicle width (towards the left side in FIG. 1), the rod 9 will then move towards a lock release position (towards the right in FIG. 1).

As shown in FIGS. 1 to 5, the cab lock mechanism of this embodiment includes the rod 9 described above, a base 10, the link 11, a cab lock hook 12, a switch 40, a lock close portion 60, and a rod connecting shaft 27 as a locking engagement part.

The link 11 is supported by the base 10 and is rotatable towards a locking position and a lock release position with the first revolving shaft 17 in the middle. The cab lock hook 12 is supported by the link 11 and is rotatable around a second revolving shaft 24, and it is thus movable towards a locking position and a lock release position relative to the base 10. When the link 11 rotates towards the locking position, the cab lock hook 12 will also then move towards the locking position. On the other hand, when the link 11 rotates towards the lock release position, the cab lock hook 12 will also then move towards the lock release position.

The base 10 has front and rear plates (i.e., a front plate 13 and a rear plate 14) facing each other at a distant. A bracket 15, which holds the base 10, is arranged on the back of the cab 1. The bracket 15 has an approximately frame shape, and the base 10 (i.e., the front plate 13 and the rear plate 14) is fastened and fixed to the bracket 15 while the main part of the bracket 15 is accommodated inside. A pin insertion hole (illustrations thereof are omitted), through which the pin 4 and the upper part of each of the front and rear support plates 5 are inserted while the cab 1 is not tilted, is formed in the lower part of the bracket 15. Moreover, the lower part of the bracket 15 is supported by a cab mount bracket 71 on the chassis side 2 via an elastic component 70 for vibration control while the cab 1 is not tilted.

In the front plate 13 and the rear plate 14, a first revolving-shaft support hole (illustrations thereof are omitted) through which the first revolving shaft 17 extending along the vehicle length is inserted and supported is formed. An engaging shaft accommodating concave portion 19, which accommodates the pin 4 while the cab 1 is not tilted, is formed at the lower part of the front plate 13. Moreover, a lock close connecting shaft 63, which rotatably supports the lock close portion 60, is formed extending backwards from the rear plate 14.

The link 11 includes front and rear tabular link plates 20 (illustrations thereof are omitted), which face each other at a distant, and a connecting section (illustrations thereof are omitted), which connects the front and rear link plates 20, and is accommodated between the plates 13 and 14 before and after the base 10. A first revolving-shaft insertion hole (illustrations thereof are omitted) through which the first revolving shaft 17 is inserted is formed in one end (lower portion in FIG. 1) of each of the front and rear link plates 20, and the link 11 is supported by the back of the cab 1 and is rotatable around the first revolving shaft 17.

In the other end (upper end in FIG. 1) of each of the front and rear link plates 20, a second revolving-shaft support hole (illustrations thereof are omitted) through which the second revolving shaft 24 extending in the vehicle length is inserted and supported is formed. Moreover, the rod connecting shaft 27 described above to which the rod 9 is connected extends backward from the other end of the rear link plate 20.

The rod 9 is connected to the rod connecting shaft 27 behind the rear link plate 20. The other end (lower end in FIG. 1) of the cab lock lever 8 (shown in FIG. 1) rotates inward along the vehicle width (towards the right in FIG. 1), and the rod 9 accordingly moves towards a locking position (towards the left in FIG. 1). The link 11 then rotates, in response to motion of the cab lock lever 8, around the first revolving shaft 17 towards a locking position (i.e., in the direction indicated by an arrow 50 in the drawing), that is, from an initial position (i.e., position shown in FIG. 2) to the locking position (position shown in FIG. 4). On the other hand, when the other end of the cab lock lever 8 rotates outward along the vehicle width and then the rod 9 moves towards the lock release position (toward the right in FIG. 1), the link 11 rotates, in response to motion of the cab lock lever 8, around the first revolving shaft 17 towards the lock release position (i.e., direction indicated by an arrow 51 in the drawing), that is, from the locking position to the initial position.

The cab lock hook 12 is a plate with an approximate L shape, and is arranged between the link plates 20 before and after the link 11. A second revolving-shaft insertion hole (illustrations thereof are omitted) through which the second revolving shaft 24 is inserted is formed in one end (upper end in FIG. 1) of the cab lock hook 12, and the cab lock hook 12 is supported by the link 11 and is rotatable around the second revolving shaft 24. That is, movement trajectory of the cab lock hook 12 relative to the cab 1 is represented by trajectory of rotation around the first revolving shaft 17 and trajectory of rotation around the second revolving shaft 24. Moreover, a hook 29, which includes a concave internal surface 30 having the upper part widely opened, is formed in the other end (lower end in FIG. 1) of the cab lock hook 12.

A spring coil (illustrations thereof are omitted) and a spacer (illustrations thereof are omitted) are arranged in the periphery of the second revolving shaft 24.

One end of the spring coil engages with the cab lock hook 12 while the other end thereof engages with the connecting section of the link 11. The cab lock hook 12 is urged towards a locking position (in the direction indicated by the arrow 50 in the drawing) relative to the link 11 by this spring coil. Moreover, although not illustrated in particular, a stopper, which regulates the moving range of the cab lock hook 12 towards the lock release position, is provided in the link 11. Therefore, in the state where no external force is applied to the cab lock hook 12 (including state where the link 11 is in an initial position), the cab lock hook 12 is maintained in a specified position relative to the link 11 by the spring coil and the stopper.

The lock close portion 60 is approximately plate-shaped and is arranged behind the rear plate 14. A connecting-shaft insertion hole (illustrations thereof are omitted) through which the lock close connecting shaft 63 is inserted is formed in the middle of the lock close portion 60, and the lock close portion 60 is supported by the base 10 and is rotatable around the lock close connecting shaft 63. The other end (lower end in FIG. 1) of the lock close portion 60 is connected to a lock close operating rod 61. In the state where at least the link 11 is in a locking position, the lock close portion 60 moves between a closing position (shown in FIG. 4) and a non-closing position (shown in FIG. 5) in response to movement of the lock close operating rod 61.

A cam portion 64 with a curved surface is formed on the outer edge of one end of the lock close portion 60 (upper end in FIG. 1), and an engaging concave portion 65 engageable with the rod connecting shaft 27 is formed between the connecting-shaft insertion hole and the cam portion 64. Moreover, a spring coil (urging member) 62 and a spacer (illustrations thereof are omitted) are arranged in the periphery of the lock close connecting shaft 63. One end of the spring coil 62 engages with the lock close portion 60 while the other end engages with the lock close connecting shaft 63. The lock close portion 60 is urged towards the closing position by this spring coil 62. When the link 11 is in the locking position, the lock close portion 60 is set in the closing position due to the urging force from the spring coil 62, and in this state, the engaging concave portion 65 of the lock close portion 60 engages with the rod connecting shaft 27, thereby preventing movement of the link 11 towards the lock release position.

Moreover, when the lock close portion 60 is in the non-closing position (shown in FIGS. 2 and 3) where engagement of the rod connecting shaft 27 with the engaging concave portion 65 is canceled, the cam portion 64 comes into contact with the outer surface of the rod connecting shaft 27, thereby preventing movement of the lock close portion 60 towards the closing position. Moreover, in the state where at least the link 11 is in the locking position, when the lock close operating rod 61 is pulled and operated, the lock close portion 60 will resist the urging force from the spring coil 62 and move to the non-closing position (shown in FIG. 5) from the closing position (shown in FIG. 4).

When the cab 1 is not tilted, the other end (lower end in FIG. 1) of the cab lock lever 8 rotates inward along the vehicle width (towards the right side in FIG. 1), the rod 9 moves towards a locking position (towards the left side in FIG. 1), and the link 11 rotates around the first revolving shaft 17 from the initial position to the locking position. The cab lock hook 12 then moves to the locking position (position shown in FIG. 4) from the initial position (position shown in FIG. 2) in the locking direction (direction indicated by the arrow 50 in the drawing) in response to rotation of the link 11.

A planate switch pressure section 66 is formed at the other end (lower end in FIG. 1) of the lock close portion 60.

The switch 40 is deployed in a location at which movement of the lock close portion 60 and the rod connecting shaft 27 cannot be disturbed, and which the switch 40 can be pressed by the switch pressure section 66 when the lock close portion 60 reaches the closing position, and is fixed to the cab 1. The switch 40 of this embodiment is attached to a switch bracket 41 fixed on the rear surface of the rear plate 14. The switch 40 changes over to an on state from an off state when it is pressed down by the switch pressure section 66. The switch 40 is connected to an indicator lamp 42 arranged in an instrument panel etc. in a passenger compartment. When the switch 40 is in an off state, the indicator lamp 42 turns on. Otherwise, when the switch 40 is in an on state, the indicator lamp 42 turns off. A passenger inside the vehicle can thus recognize whether or not it is in a cab locked state by observing the indicator lamp 42.

The cab lock hook 12, immediately after starting moving towards the locking position from the initial position, rotates around the first revolving shaft 17 towards the locking position (in the direction indicated by the arrow 50 in the drawing) from the initial position (position shown in FIG. 2) while it is maintained in a specified position relative to the link 11 by the spring coil and the stopper.

When the cab lock hook 12 progresses towards the locking position and the inner edge of the cab lock hook 12 then comes into contact with the pin 4, the cab lock hook 12 receiving an urging force from the spring moves towards the locking position around the second revolving shaft 24 in response to rotation of the link 11 towards the locking position while the cab lock hook 12 stays in contact with the pin 4. Due to rotation around the second revolving shaft 24, the hook 29 moves towards the locking position and then approaches the pin 4 from below.

When the cab lock hook 12 further progresses towards the locking position, as shown in FIG. 3, the internal surface 30 of the hook 29 will engages with the pin 4 from below immediately before the locking position, and the hook 29 will then give an upward tractive force to the pin 4 in the locking position shown in FIG. 4.

As a result, the cab lock mechanism enters a cab locked state. In the cab locked state, the cab 1 is locked securely and firmly on the chassis side 2.

Moreover, while the link 11 and the cab lock hook 12 are moving until immediately before the locking positions from the respective initial positions, as shown in FIGS. 2 and 3, the outer surface of the rod connecting shaft 27 slides on the cam portion 64 of the lock close portion 60. Contact of the rod connecting shaft 27 with the cam portion 64 prevents movement of the lock close portion 60 towards the closing position against the urging force from the spring coil 62. For example, in the initial position shown in FIG. 2, a sufficient distance L between the switch pressure section 66 and the switch 40 is maintained. As a result, maintaining the off state of the switch 40 in a non-closing position is secured.

Moreover, when the link 11 and the cab lock hook 12 arrive at the respective locking positions, the rod connecting shaft 27 moves into the engaging concave portion 65 from on top of the cam portion 64 due to the urging force from the spring coil 62, the rod connecting shaft 27 engages with the engaging concave portion 65, and the lock close portion 60 moves to the closing position from the non-closing position. As a result, the switch 40 is pressed down by the switch pressure section 66, changing the off state of the switch 40 to an on state. In this state, since the lock close portion 60 is maintained in the closing position due to the urging force of the spring coil 62, the on state of the switch 40 is maintained securely.

On the other hand, when the lock close operating rod 61 is pulled and operated in a cab locked state shown in FIG. 4, the lock close portion 60 moves to the non-closing position from the closing position as shown in FIG. 5, engagement of the rod connecting shaft 27 with the engaging concave portion 65 is canceled, thereby allowing movement of the link 11, and the switch 40 then enters an off state. In this state, when the other end of the cab lock lever 8 rotates outward along the vehicle width, and the rod 9 then moves in the lock release direction (towards the right in FIG. 1) and the link 11 rotates around the first revolving shaft 17 in the lock release direction from the locking position, the cab lock hook 12 moves along a reverse trajectory to that when moving in the above-mentioned lock direction, and then returns to the initial position. As a result, the cab lock mechanism enters the initial state.

As described above, according to this embodiment, for locking the non-tilted cab 1 on the chassis side 2, the cab lock lever 8 is operated to the locking position. At this time, the link 11 rotates around the first revolving shaft 17 in the locking direction from the initial position to the locking position in response to movement of the cab lock lever 8, and the cab lock hook 12 then moves to the locking position from the initial position in the locking direction in response to rotation of the link 11. Such movement of the cab lock hook 12 causes the hook 29 of the cab lock hook 12 to engage from below with the pin 4 fixed to the chassis side 2, and then gives an upward tractive force to the pin 4. As a result, the cab 1 is locked securely and firmly on chassis side 2. In this cab locked state, the urging force of the spring coil 62 makes the rod connecting shaft 27 engage with the engaging concave portion 65, the lock close portion 60 moves to the closing position from the non-closing position, and the switch 40 is then pressed by the switch pressure section 66, thereby changing the switch 40 to be in the on state from the off state. In this state, since the lock close portion 60 is held in the closing position by the urging force from the spring coil 62, the switch 40 is maintained in the on state securely.

On the other hand, when unlocking the cab 1, pull the lock close operating rod 61 and operate the cab lock lever 8 in the lock release direction. At this time, the lock close portion 60 moves to the non-closing position from the closing position, the link 11 rotates around the first revolving shaft 17 in the lock release direction from the locking position to the initial position in response to movement of the cab lock lever 8, and the cab lock hook 12 moves in the lock release direction from the locking position to the initial position in response to rotation of the link 11. Such movement of the cab lock hook 12 causes the hook 29 of the cab lock hook 12 to separate from the pin 4. As a result, the cab 1 is unlocked from the chassis side 2. Moreover, movement of the lock close portion 60 to the non-closing position makes the switch change to the off state from the on state. Once the link 11 moves from the locking position, even if pulling of the lock close operating rod 61 is stopped, movement of the lock close portion 60 to the closing position against the urging force of the spring coil 62 is prevented by the rod connecting shaft 27 contacting with the cam portion 64, thereby maintaining the switch 40 in the off state securely.

Moreover, since the switch pressure section 66, which presses down the switch 40, is formed in the lock close portion 60, which maintains the cab locked state, the cab locked state can be detected surely.

Moreover, since the switch pressure section 66 and the switch 40 are both arranged on the cab 1 side, the switch pressure section 66 and the switch 40 are rarely influenced by vibration of the cab 1 to the chassis side 2, as compared with the case where they are divided into the chassis side 2 and the cab 1 side.

Therefore, decrease in durability of the switch 40 and decrease in detection accuracy can be suppressed.

In addition, while the rod connecting shaft 27 functions as a locking engagement part with the engaging concave portion 65 in the embodiment described above, an engagement protrusion functioning as a locking engagement part may be arranged separately in the link 11.

INDUSTRIAL APPLICABILITY

The present invention may be applied to a cab lock mechanism for locking a tiltable cab on a chassis side.

The invention claimed is:

1. A cab lock mechanism of a cab-over-engine vehicle, which locks on a chassis side the other end of a non-tilted cab tiltable around one end of the cab; said cab lock mechanism comprising:
    a rod, which is arranged on a cab side and moves in response to a cab lock lever;
    a link, which is rotatably supported by the other end of the cab, rotates in a locking direction from an initial position in response to movement of the rod, and reaches a locking position;
    a cab lock hook, which is rotatably supported by the link, moves in a locking direction from an initial position and reaches a locking position in response to rotation of the link toward the locking position, and engages with a pin fixed to the chassis side in the locking position;
    a switch, which is fixed to the other end of the cab;
    a locking engagement part, which is formed in the link;
    a lock close portion, which is rotatably supported by the other end of the cab and is movable between a closing position and a non-closing position; wherein
    the lock close portion in the closing position engages with the locking engagement part while the link is positioned in the locking position, and prevents movement of the link in a lock release direction,
    the lock close portion comprises a switch pressure section, which comes in contact with and presses down the switch when the lock close portion reaches the closing position from the non-closing position, and
    a state of the switch changes to make a passenger recognize that the cab lock mechanism is in a cab locked state, when the switch is pressed down by the switch pressure section, and wherein
    the lock close portion comprises
    a cam comprising a curved portion, which comes into direct contact with the link and prevents movement of the lock close portion towards the closing position while the lock close portion is positioned in the non-closing position and the link is positioned in the initial position.

2. The cab lock mechanism of the cab-over-engine vehicle according to claim 1, further comprising an urging means for urging the lock close portion towards the closing position.

* * * * *